(12) United States Patent
Ruth et al.

(10) Patent No.: US 9,796,267 B1
(45) Date of Patent: Oct. 24, 2017

(54) MACHINE OPERATION ASSISTANCE BASED ON HEIGHT DETECTION OF MACHINE LOAD USING A CAMERA

(71) Applicant: Caterpillar Inc., Peoria, IL (US)

(72) Inventors: Eric J. Ruth, Peoria, IL (US); Brett M. Nee, Metamora, IL (US); Qi Wang, Pittsburgh, PA (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 15/172,295

(22) Filed: Jun. 3, 2016

(51) Int. Cl.
*B60K 35/00* (2006.01)
*B60R 1/00* (2006.01)
*B60W 40/13* (2012.01)

(52) U.S. Cl.
CPC ............... *B60K 35/00* (2013.01); *B60R 1/00* (2013.01); *B60W 40/13* (2013.01); *B60R 2300/105* (2013.01); *B60R 2300/80* (2013.01)

(58) Field of Classification Search
CPC .......... B60K 35/00; B60W 40/13; B60R 1/00; B60R 2300/80; B60R 2300/105
See application file for complete search history.

(56) References Cited

U.S. PATENT DOCUMENTS

| 8,577,530 | B2 | 11/2013 | Ruth et al. |
| 9,014,898 | B2 | 4/2015 | Saito et al. |
| 9,022,153 | B2 | 5/2015 | Tojima et al. |
| 9,204,106 | B2 | 12/2015 | Mitsuta et al. |
| 2013/0126251 | A1 | 5/2013 | Ruth |
| 2013/0222592 | A1* | 8/2013 | Gieseke ................. G08G 1/04 348/148 |
| 2013/0261901 | A1 | 10/2013 | Hendrickson |
| 2014/0110205 | A1 | 4/2014 | Dronnik |
| 2014/0347483 | A1 | 11/2014 | Nakanishi et al. |
| 2015/0262091 | A1* | 9/2015 | Yamagata ............. G01G 19/12 345/440 |

FOREIGN PATENT DOCUMENTS

WO    WO 02/086519    * 10/2002

* cited by examiner

*Primary Examiner* — Anne M Antonucci
(74) *Attorney, Agent, or Firm* — James S. Bennin (57) ABSTRACT

A system may comprise a load sensor; a camera; and an electronic control module. The load sensor may configured to detect a load placed on a vehicle that is to travel along a path. The camera may be associated with the vehicle and may be configured to capture an image of the load placed on the vehicle. The electronic control module may configured to receive, from the load sensor, information indicating that the load has been placed on the vehicle, cause the camera to capture the image of the load based on receiving the information indicating that the load has been placed on the vehicle, determine whether the height of the load exceeds a height of a trolley line included in the path, and provide, for display by a display of the vehicle, information indicating whether the height of the load exceeds the height of the trolley line.

20 Claims, 6 Drawing Sheets

MACHINE OPERATION ASSISTANCE BASED ON HEIGHT DETECTION OF MACHINE LOAD USING A CAMERA

TECHNICAL FIELD

The present disclosure generally relates to providing assistance for operation of a machine, and more particularly relates to providing assistance for the operation based on detecting, using a camera, a height of a load placed on the machine.

BACKGROUND

A machine, such as an electric drive machine, may include a trolley attachment, such as a pantograph assembly, on a top portion of the machine. The pantograph assembly may be raised to establish a connection with a power line (or a trolley line). In such an instance, power may be drawn, from the power line, and supplied to the machine (e.g., supplied to an electric drive system of the machine), thereby enabling an engine of the machine to idle and enabling fuel to be preserved as the machine travels on a path under the power line.

In some instances, a height of a load, placed on the machine, may exceed a height of the power line. Accordingly, the load may damage the power line as the machine travels along the path under the power line. Damages to the power line may negatively affect productivity at a site in which the machine is operating.

U.S. Pat. No. 9,204,106 (hereinafter the "'106 patent") is directed to a load display device of a dump truck. The load display device includes a display component that displays a bird's-eye image of a periphery of the dump truck and further includes a detector that is configured to detect a load of the dump truck. However, the '106 patent does not disclose or suggest detecting a height of the load and determining whether the height of the load exceeds a height of a power line. In fact, the '106 patent neither discloses or suggests a height of the load nor a height of a power line.

SUMMARY OF THE INVENTION

In some embodiments, a method may comprise receiving, by an electronic control module of a machine, first information indicating that a load has been placed on the machine. The first information being received from a load sensor of the machine. The method may further comprise receiving, by the electronic control module, second information indicating a movement of the machine towards a path. The second information being received from a speed sensor of the machine, the path including a power line. The method may further comprise capturing, by the electronic control module and using a camera associated with the machine, an image of the load based on receiving the first information and receiving the second information; and comparing, by the electronic control module and prior to the machine traveling under the power line, the height of the load to a height of the power line. The method may further comprise providing, by the electronic control module and for display by a display of the machine, information regarding the height of the load based on the comparing, prior to the machine traveling under the power line.

In some embodiments, a system may comprise a load sensor; a camera; and an electronic control module. The load sensor may configured to detect a load placed on a vehicle that is to travel along a path. The camera may be associated with the vehicle and may be configured to capture an image of the load placed on the vehicle. The electronic control module may configured to receive, from the load sensor, information indicating that the load has been placed on the vehicle, cause the camera to capture the image of the load based on receiving the information indicating that the load has been placed on the vehicle, determine whether the height of the load exceeds a height of a trolley line included in the path, prior to the vehicle traveling under the trolley line, and provide, for display by a display of the vehicle, information indicating whether the height of the load exceeds the height of the trolley line prior to the vehicle traveling under the trolley line.

In some embodiments, a machine may comprise a load sensor configured to detect a load placed on the machine. The machine may further comprise a camera configured to capture an image of the load placed on the vehicle and comprise a display. The machine may further comprise an electronic control module configured to: receive, from the load sensor, information indicating that the load has been placed on the vehicle, cause the camera to capture the image of the load based on receiving the information indicating that the load has been placed on the vehicle, and determine whether the height of the load exceeds a height of a trolley line included in a path along which the machine is to travel, prior to the machine traveling under the trolley line. The electronic control module may cause the display to display information indicating whether the height of the load exceeds the height of the trolley line.

DETAILED DESCRIPTION

The following detailed description refers to the accompanying drawings. The same reference numbers in different drawings may identify the same or similar elements.

Figure 1:
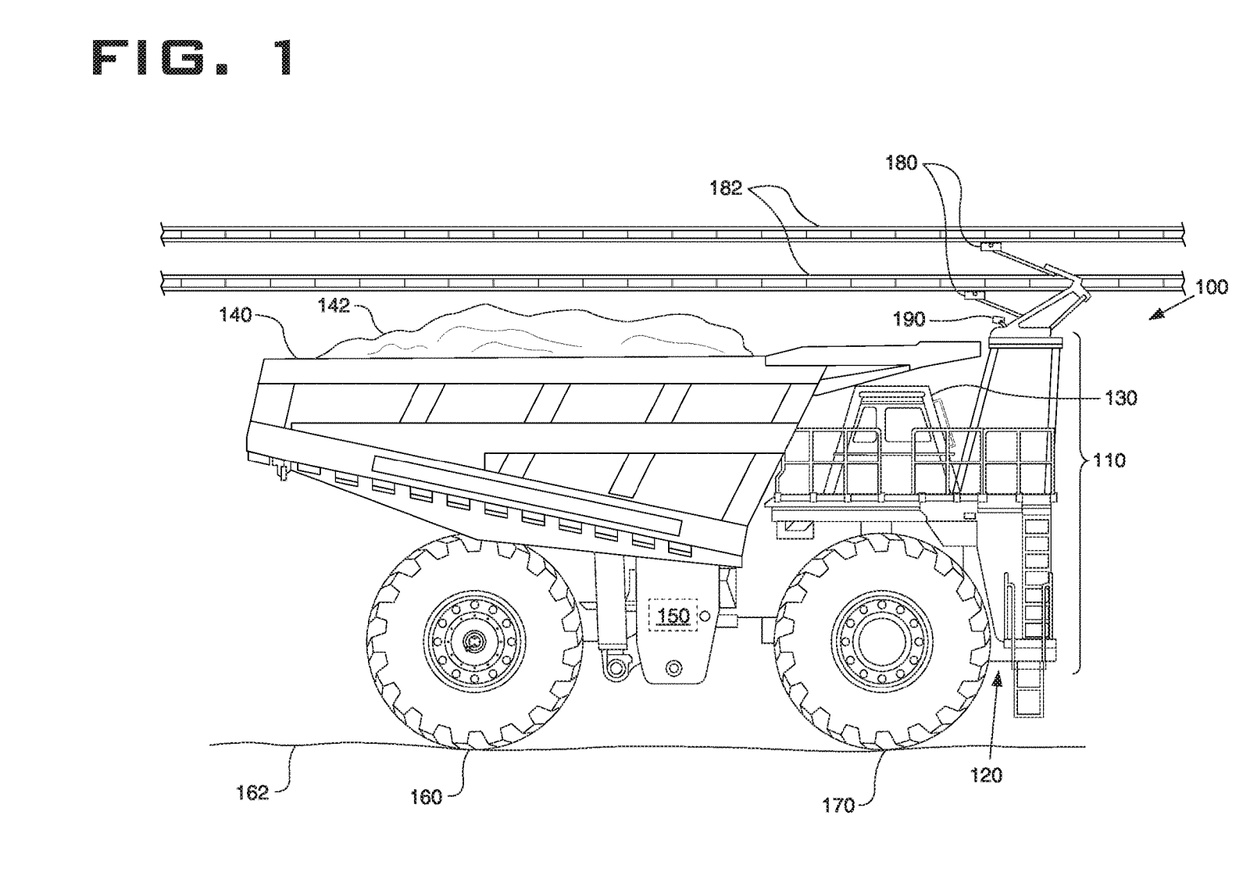
FIG. 1 is a side view of a machine according to one embodiment of the present disclosure.

FIG. 1 is a side view of a machine 100 (or a vehicle) according to one of embodiment of the present disclosure. In some implementations, machine 100 may include an off-highway truck, an on-highway truck, a dump truck, or an articulated truck. Machine 100 may be any machine associated with various industrial applications, including, but not limited to, mining, agriculture, forestry, construction, and/or other industrial applications.

As illustrated in FIG. 1, machine 100 may include a structure 110 and further include a frame (or chassis) 120 that supports various components of the machine 100, such an operator cab 130 and a truck bed (or dump body) 140. In some embodiments, truck bed 140 may receive a load 142. As further illustrated in FIG. 1, machine 100 may also include an electric drive system 150, a rear set of ground engaging members 160 (or rear ground engaging members 160), and a front set of ground engaging members 170 (front ground engaging members 170). In some embodiments, electric drive system 150 may include a power circuit that selectively activates one or more electric motors that cause movement of rear ground engaging members 160 and/or movement of front ground engaging members 170, thereby causing movement of machine 100 along a path 162. In some embodiments, rear ground engaging members 160 and/or front ground engaging members 170 may include tires.

As further illustrated in FIG. 1, machine 100 may also include a set of pantographs 180 (or pantographs 180) and a camera 190 located on structure 110. In some embodiments, pantographs 180 may be raised to establish a connection with a set of power lines 182 (or power lines 182 or trolley lines 182). Accordingly, pantographs 180 may receive electrical power from power lines 182 and the electrical power may be supplied to electric drive system 150, thereby causing the movement of machine 100. Pantographs 180 may be lowered and, thereby, may be disconnected from power lines 182.

In some embodiments, camera 190 may face a rear portion of the machine 100 and may capture an image of an area surrounding the rear portion of the machine. For example, camera 190 may capture of an image of load 142 placed on truck bed 140. The image may be used to determine a height of load 142 for the purpose of determining whether the height of load 142 exceeds a height of power lines 182, as will be explained in further detail below.

In some embodiments, machine 100 may include multiple cameras 190 and may be located on structure 110 and/or truck bed 140. For example, a first camera 190 may located on structure 10 and may face the rear portion of machine 100, a second camera 190 may be located on a first side portion of truck bed 140 and may face a second side (opposite of the first side) of truck bed 140, a third camera 190 may be located on the second side portion of truck bed 140 and may face the first side of truck bed 140 and so forth.

The number of components shown in FIG. 1 is provided for explanatory purposes. In practice, there may additional components, fewer components, different components, or differently arranged components than those shown in FIG. 1. For example, machine 100 may include an engine.

Figure 2:
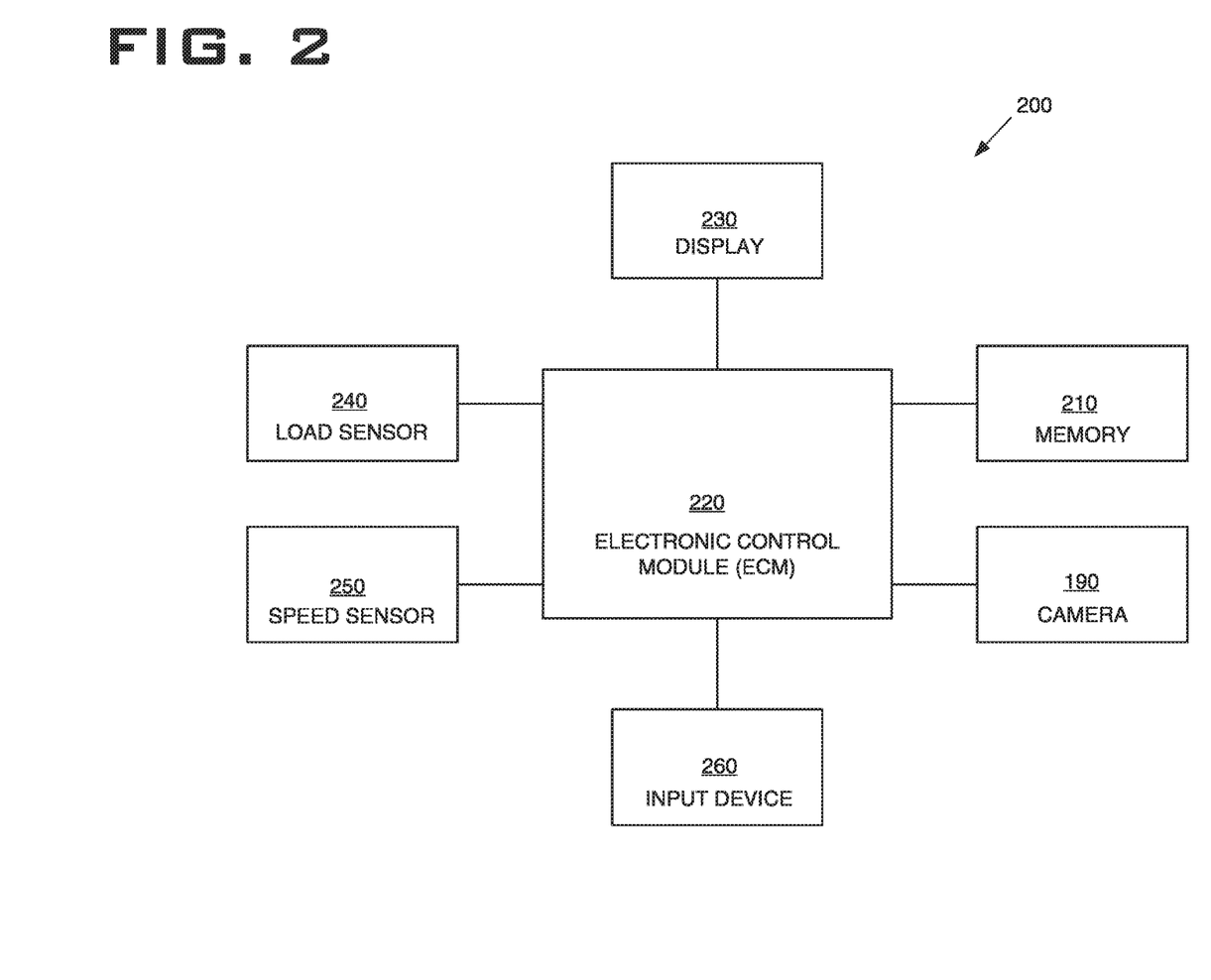
FIG. 2 is a diagram of example components of the machine of FIG. 1.

FIG. 2 is a diagram of example components 200 of machine 100 of FIG. 1. Example components 200 may include electrical components of the machine 100. In some embodiments, example components 200 may include a camera 190 (or multiple cameras 190), a memory 210, an electronic control module (ECM) 220, a display 230, a load sensor 240, a speed sensor 250, and an input device 260. Example components 200 may be implemented using hardware, software, and/or a combination of hardware and software. In some implementations, memory 210, ECM 220, display 230, and/or input device 260 may be located inside or in an area proximate to operator cab 130.

Camera 190 may include any device capable of capturing (or obtaining) an image of components of machine 100 and an area surrounding machine 100. For example, as explained above, camera 190 may capture of an image of a rear view and/or a bird's eye view of machine 100 (including an image of load 142 placed on truck bed 140) and may transmit the image to ECM 220 to enable ECM 220 to determine whether the height of load 142 exceeds a height of power lines 182. In some embodiments, camera 190 may capture an image feed (or a video) of the rear view and/or the bird's eye view and transmit the image feed (or the video) to ECM 220. In some embodiments, camera 190 may include a network camera, a wide angle camera (e.g., 140 degrees), and/or the like. For example, the network camera may be any camera that sends and/or receives data (video data and/or image data) over a network (wired network and/or wireless network). In some embodiment, the image of load 142 may be a bird's eye view image of load 142.

Memory 210 may include a random access memory ("RAM"), a read only memory ("ROM"), and/or another type of dynamic or static storage device (e.g., a flash, magnetic, or optical memory) that stores information and/or instructions for use by other components 200 of machine 100, such as electronic control module 220. Additionally, or alternatively, memory 210 may include non-transitory computer-readable medium or memory, such as a disc drive, flash drive, optical memory, read-only memory (ROM), or the like. In some implementations, memory 210 may store the information and/or the instructions in one or more data structures, such as one or more databases, tables, lists, trees, etc.

ECM 220 may include any type of device or any type of component that may interpret and/or execute the instructions stored within memory 210 to perform one or more functions. For example, ECM 220 may execute the instructions to determine whether the height of load 142 exceeds the height of power lines 182. In some implementations, ECM 220 may include a processor (e.g., a central processing unit, a graphics processing unit, an accelerated processing unit), a microprocessor, and/or any processing logic (e.g., a field-programmable gate array ("FPGA"), an application-specific integrated circuit ("ASIC"), etc.), and/or any other hardware and/or software.

In some embodiments, ECM 220 may obtain information from the electrical components of machine 100 and use the information to determine whether the height of load 142 exceeds the height of power lines 182. For example, ECM 220 may obtain information from load sensor 240 and/or from speed sensor 250, obtain the image of load 142 from camera 190, obtain information from input device 260, and determine whether the height of load 142 exceeds a height of power lines 182 based on the image of load 142. For example, ECM 220 may determine whether the height of load 142 is above or exceeds a reference (or a reference point) in the image of load 142.

In some implementations, ECM 220 may transmit, via a network (not shown) information to a back office system (not shown). For example, ECM 220 may transmit the image, captured by camera 190, to the back office system for processing, as will be explained in further detail below. ECM 220 may receive a result of the processing from the back office system and may determine whether the height of load 142 exceeds the height of power lines 182 based on the result of the processing. Additionally, or alternatively, ECM 220 may receive, via the network, information identifying the height of power lines 182. In some implementations, the back office system may include one or more devices and the network may include one or more wired and/or wireless networks.

Display 230 may include any type of device or any type of component that may display information. For example, display 230 may display information relating to machine 100. For instance, display 230 may display information indicating whether a height of a load, placed on truck bed 140, exceeds a height of power lines 182. In some embodiments, display 230 may be a liquid crystal display (LCD), a light-emitting diode (LED) display, an organic light-emitting diode (OLED) display, and/or the like.

Load sensor 240 may include any type of device or any type of component that may sense (or detect) that a load has been placed on truck bed 140 and may transmit, to ECM 220, information indicating that a load has been placed on truck bed 140. For example, load sensor 240 may include a pressure sensor (e.g., to detect machine strut pressures), a force gauge, a load cell, and/or any other components capable of sensing (or sensing) that a load has been placed truck bed 140. In some embodiments, load sensor 240 may be located near or on a portion of truck bed 140.

Speed sensor 250 may include any component or any type of device that may sense (or detect) a movement of machine 100 and may transmit, to ECM 220, a movement of machine 100. For example, speed sensor 250 may detect a speed of machine 100. In some embodiments, speed sensor 250 may include an accelerometer. For example, the accelerometer may include a laser accelerometer, a low frequency accelerometer, a bulk micromachined capacitive accelerometer, a strain gauge accelerometer, and a bulk micromachined piezoelectric accelerometer, and/or the like. In some embodiments, speed sensor 250 may include an inertial measurement device. For example, the inertial measurement device may measure any linear and/or angular motion of machine 100. In some embodiments, speed sensor 250 may be located on a portion of frame 120 near rear ground engaging members 160 or front ground engaging members 170. Additionally, or alternatively, speed sensor 250 may be pointing toward a ground surface.

Input device 260 may include a component that permits a user (e.g., an operator) to input information to one or more components of ECM 220. For example, the information, input by the user, may include a preference (of the user) for a reference point that may be used to determine whether the height of load 142 exceeds the height of power lines 182. Additionally, the information, input by the user, may include information identifying a height of power lines 182. In some embodiments, input device 260 may include a keyboard, a keypad, a mouse, a button, a camera, a microphone, a switch, a touch screen display, and/or the like.

The number of components shown in FIG. 2 is provided for explanatory purposes. In practice, there may additional components, fewer components, different components, or differently arranged components than those shown in FIG. 2. For example, example components 200 may include global positioning system (GPS) to track and locate a position of machine 100.

Figure 3:
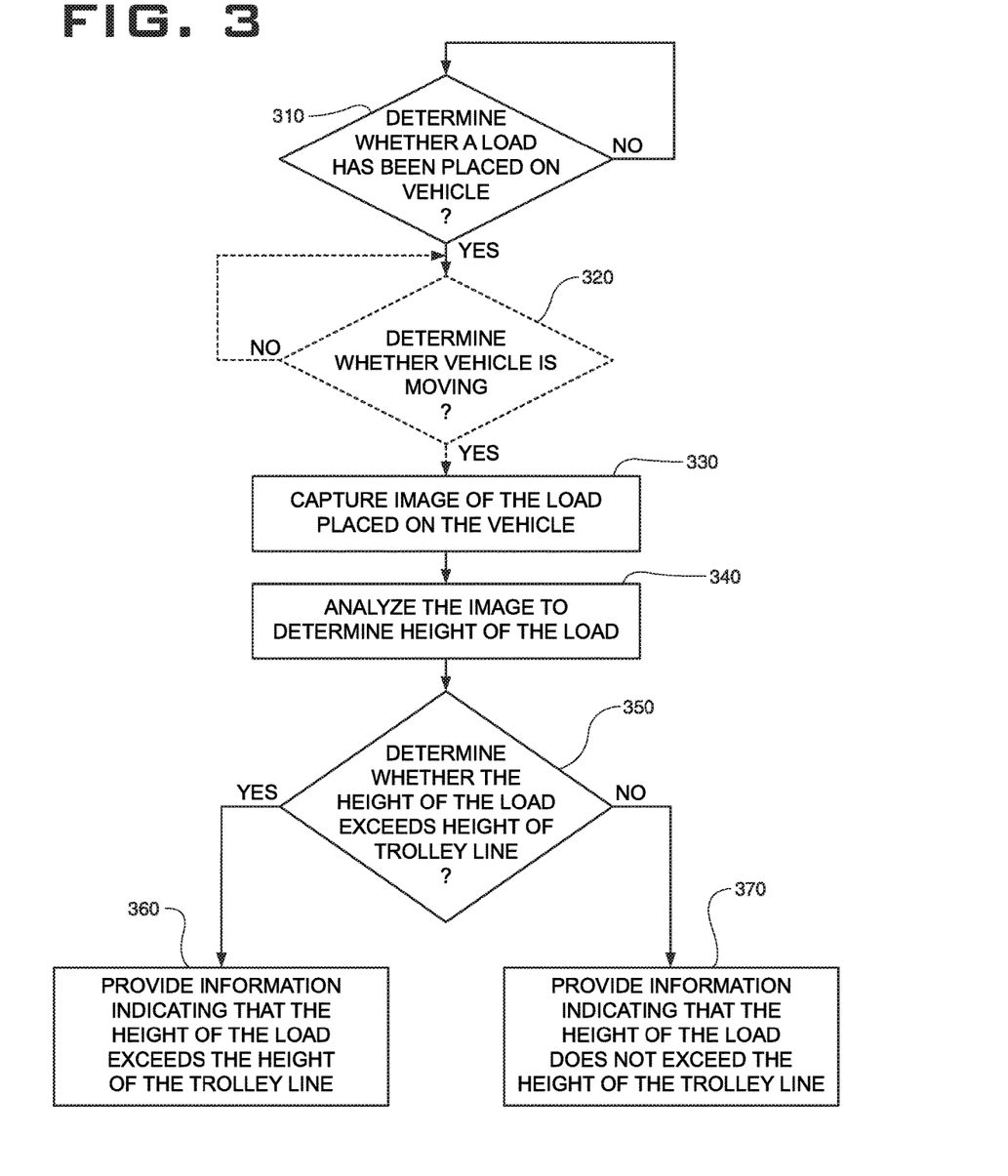
FIG. 3 is a flow chart of an example process for providing assistance to an operator based on a height of a load placed on the machine of FIG. 1.

FIG. 3 is a flow chart of an example process 300 for providing assistance to an operator based on a height of a load placed on machine 100 of FIG. 1. In some implementations, one or more process blocks of process 300 may be performed by ECM 220. For example, ECM 220 may perform one or more process blocks of process 300 automatically (e.g., without intervention/input from an operator of machine 100). In some implementations, one or more process blocks of FIG. 3 may be performed by another device or a group of devices separate from or including ECM 220, such as the back office system.

As shown in FIG. 3, process 300 may include determining whether a load has been placed on a vehicle (block 310). For example, ECM 220 may determine whether load sensor 240 has transmitted loaded information indicating that load 142 has been placed on truck bed 140 or transmitted unloaded information indicating that no load has been placed on truck bed 140. In some embodiments, load sensor 240 may transmit loaded information when load sensor 240 determines that load 142 has been placed on truck bed 140 or may transmit unloaded information when load sensor 240 determines that no load has been placed on truck bed. For example, load sensor 240 may determine whether a weight of truck bed 140 has increased or exceeds a threshold weight and may transmit loaded information when the weight of truck bed 140 has increased or exceeds the threshold weight. Alternatively, load sensor 240 may transmit unloaded information when the weight of truck bed 140 does not exceed the threshold weight.

Figure 4A:
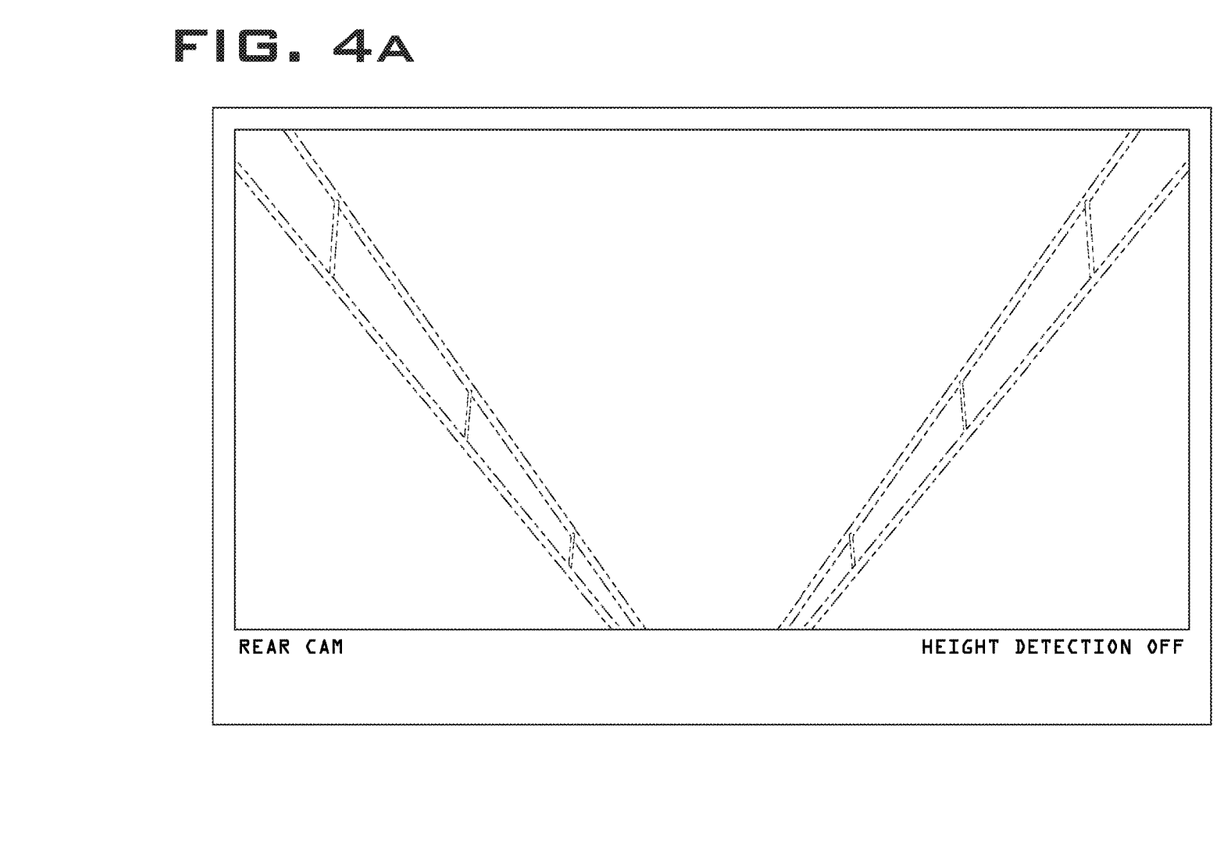
FIGS. 4A-4C are diagrams of examples of the process described in FIG. 3.

As further shown in FIG. 3, if load sensor 240 has transmitted unloaded information and ECM 220 determines, based on the unloaded information, that no load has been placed on truck bed 140, (block 310—NO), then process 300 may return to block 310. In some implementations, ECM 220 may cause display 230 to display information indicating that no load has been placed on truck bed 140, as illustrated on FIG. 4A. For example, ECM 220 may obtain an image of a rear portion of machine 100 (without load 142) from camera 190 and may cause display 230 to display the image of the rear portion of machine 100.

Referring back to FIG. 3, if load sensor 240 has transmitted loaded information and ECM 220 determines that load 142 has been placed on truck bed 140 (block 310—YES), then process 300 may include determining whether the vehicle is moving. For example, after receiving loaded information from load sensor 240, ECM 220 may receive movement information or non-movement information from speed sensor 250 and determine whether machine 100 is moving based on receiving movement information or non-movement information.

In some embodiments, speed sensor 250 may determine whether an acceleration of machine 100 exceeds a threshold acceleration and/or determine whether a speed of machine 100 exceeds a threshold speed. For example, if speed sensor 250 determines that the acceleration of machine 100 exceeds the threshold acceleration and/or determines that the speed of machine 100 exceeds the threshold speed (and/or detects a particular linear and/or angular motion of machine 100), speed sensor 250 may transmit movement information to ECM 220. Alternatively, if speed sensor 250 determines that the acceleration of machine 100 does not exceed the threshold acceleration and/or determines that the speed of machine 100 does not exceed the threshold speed (and/or does not detect a particular linear and/or angular motion of machine 100), speed sensor 250 may transmit non-movement information to ECM 220.

As further shown in FIG. 3, if speed sensor 250 has transmitted non-movement information and ECM 220 determines, based on the non-movement information, that machine 100 is not moving, (block 320—NO), then process 300 may return to block 320. In some embodiments, process 300 may return to block 310.

As further shown in FIG. 3, if speed sensor 250 has transmitted movement information and ECM 220 determines, based on the movement information, that machine 100 is moving (block 320—YES), then process 300 may include capturing an image of the load placed on the vehicle. In some embodiments, process 300 may include capturing the image of the load based on the loaded information and independently of the movement information. For example, after receiving the loaded information from load sensor 240 and/or receiving the movement information from speed sensor 250, ECM 220 may cause camera 190 to capture an image of load 142 placed on truck bed 140. In some implementations, ECM 220 may cause camera 190 to capture the image of load 142 following a threshold amount of time after receiving the loaded information from and/or receiving the movement information. For example, ECM 220 may cause camera 190 to capture the image of load 142 after ECM 220 determines that machine 100 has reached a threshold speed for a threshold amount of time.

In some embodiments, machine 100 may include multiple cameras 190 and ECM 220 may cause cameras 190 to capture multiple images of load 142. In such instances, cameras 190 may obtain images of different angles of load 142. In some embodiments, ECM 220 may cause one or more of cameras 190 to capture one or more images of load 142 based on preference information of an operator of machine 100. For example, the operator may submit the preference information using input device 260 and the preference information may be stored in memory 210. The preference information may include information identifying one or more of cameras 190. ECM 220 may retrieve the preference information from memory 210 and cause one or more of cameras 190, identified in the preference information, to capture the one or more images. In some embodiments, the image or the one or more images may be one or more bird's eye view of load 142. In some embodiments, the preference information may include the threshold amount of time.

As further show in FIG. 3, process 300 may include analyzing the image to determine height of the load (block 340). For example, prior to machine 100 traveling under power lines 182, ECM 220 may analyze the image of load 142 or analyze the one or more images of load 142 to determine the height of load 142. In some embodiments, ECM 220 may analyze the image or the one or more images, using one or more image analysis methods known to one skilled in the art, to identify a highest portion of load 142 (e.g., one or more highest portions of load 142). For example, ECM 220 may use object recognition (two dimensional and/or three dimensional), image segmentation, motion detection, video tracking, optical flow, three dimensional pose estimation, and/or the like to identify the highest portion of load 142. For instance, ECM 220 may analyze one or more pixels, analyze contrast, analyze tones, analyze shades and colors, and/or the like to identify the highest portion of load 142.

In some embodiments, ECM 220 may determine the height of load 142 by determining a height of the highest portion of load 142 with respect to a reference point (or a reference) included in the image. The reference point may include any portion of machine 100. For example, ECM 220 may determine a distance (for example, a vertical distance or a height) from the reference point to the highest portion of load 142. For instance, the reference point may be truck bed 140 (for example, a canopy of truck bed 140) and ECM 220 may determine a distance (or a height) from truck bed 140 (e.g., from a top surface of truck bed 140) to the highest portion of load 142. Additionally, or alternatively, the reference point may be pantographs 180 and ECM 220 may determine a distance (or a height) from pantographs 180 (e.g., from a top surface and/or a bottom surface of pantographs 180) to the highest portion of load 142.

In some embodiments, ECM 220 may prompt the operator to identify a reference point (e.g., one or more reference points). For example, ECM 220 may cause display 230 to display information requesting input from the operator regarding the reference point and the operator may submit information identifying the reference point using input device 260. Additionally, or alternatively, ECM 220 may retrieve the preference information (including reference point information identifying the reference point) from memory 210 and identify the reference point based on the reference point information. The reference point information may include information identifying the reference point and a height of the reference point (e.g., from a ground surface to the reference point).

In some embodiments, memory 210 may be preloaded with the reference point information. Additionally, or alternatively, the operator may submit the reference point information using input device 260 and the reference point information may be stored in memory 210. Additionally, or alternatively, the reference point may be a last reference point used by ECM 220 to determine a height of a load placed on truck bed 140.

In some embodiments, ECM 220 may transmit the image of load 142 to the back office system along with a request to determine the height of load 142 and may receive, from the back office system, information identifying the height of load 142. In other words, ECM 220 may cause the back office system to determine the height of load 142 in addition to or instead of ECM 220 determining the height of load 142.

As further show in FIG. 3, process 300 may include determining whether the height of the load exceeds a height of power lines (block 340). For example, prior to machine 100 traveling under power lines 182, ECM 220 may determine whether the height of load 142 exceeds the height of power lines 182. In some embodiments, ECM 220 may receive information identifying the height of power lines 182 from the operator (e.g., from the ground surface to power lines 182). For example, the operator may submit information identifying the height of power lines 182 using input device 260. In some embodiments, ECM 220 may receive the information identifying the height of power lines 182 from a device. For example, ECM 220 may receive the information identifying the height of power lines 182 from a user device of the operator (e.g., before or after the operator enters operator cab 130) or a user device of another operator. The user device may include a smart phone, a desktop computer, a laptop computer, a tablet computer, a gaming device, and/or another type of wired or wireless user device. Additionally, or alternatively, 220 may receive information identifying the height of power lines 182 from the back office system.

In some embodiments, ECM 220 may determine the height of power lines 182 based on power line height information stored in memory 210. For example, memory 210 may store the power line height information in a data structure and the power line information, stored in the data structure, may include information identifying different power lines (e.g., unique identifier), information identifying locations of the different power lines, and information identifying heights of the different power lines. The different power lines may include power lines 182. In such instance, ECM 220 may obtain information identifying a location of machine 100 using the GPS and may search memory 210 using the information identifying of the location of machine 100. Based on searching memory 210, ECM 220 may identify power lines within a threshold distance of the location of machine 100 (e.g., closest to the location of machine 100) and identify the height of the power lines. Additionally, or alternatively, ECM 220 may obtain information identifying power lines 180 and may search memory 210 using the information identifying power line 180. Based on searching memory 210, ECM 220 may identify the height of the power lines (e.g., power lines 182).

In some embodiments, prior to machine 100 traveling under power lines 182, ECM 220 may determine whether the height of load 142 exceeds the height of power lines 182 based on the reference point. For example, ECM 220 may determine a threshold height (for example, a maximum value) above which the height of load 142 may considered to exceed the height of power lines 142. For instance, the threshold height may be a height above the reference point. Additionally, or alternatively, ECM 220 may calculate the threshold height as a difference between the height of the reference point and the height of power lines. ECM 220 may compare the threshold height to the height of load 142. For instance, ECM 220 may determine a portion of the height of load 142 above the reference point and determine whether the portion of the height of load 142 exceeds the threshold point. If the height of load 142 exceeds the threshold height (or if the height of load 142 exceeds a reference line corresponding to the reference point), ECM 220 may determine that the height of load 142 exceeds the height of power lines 142. Alternatively, if the height of load 142 does not exceed the threshold height (or if the height of load 142 does not exceed the reference line), ECM 220 may determine that the height of load 142 does not exceed the height of power lines 142.

In some embodiments, memory 210 may store information identifying a threshold height for each reference point. For example, memory 210 may store a data structure that associates a threshold height with information identifying a reference point. In some embodiments, the threshold height may be different for each reference point. Alternatively, or additionally, the threshold height may be same (or substantially same) for two or more reference points. In some embodiments, the threshold height may be submitted using input device 260, a user device, the back office system, and/or the like.

In some embodiments, ECM 220 may compare the height of load 142 to the height of power lines 182 and may cause display 230 to display information regarding the height of load 142 based on the comparison, prior to machine 100 traveling under power line 182 (as will be explained in more detail below). In some embodiments, ECM 220 may transmit the image of load 142 to the back office system along with a request to determine whether the height of load 142 exceeds the height of power lines 182 and may receive, from the back office system, information indicating whether the height of load 142 exceeds the height of power lines 182. In other words, ECM 220 may cause the back office system to determine whether the height of load 142 exceeds the height of power lines 182 in addition to or instead of ECM 220 determining whether the height of load 142 exceeds the height of power lines 182. In some embodiments, ECM 220 may compare the height of load 142 to the height of power lines 182 and may determine whether the height of load 142 exceeds the height of power lines 182 based on a result of the comparison.

Figure 4B:
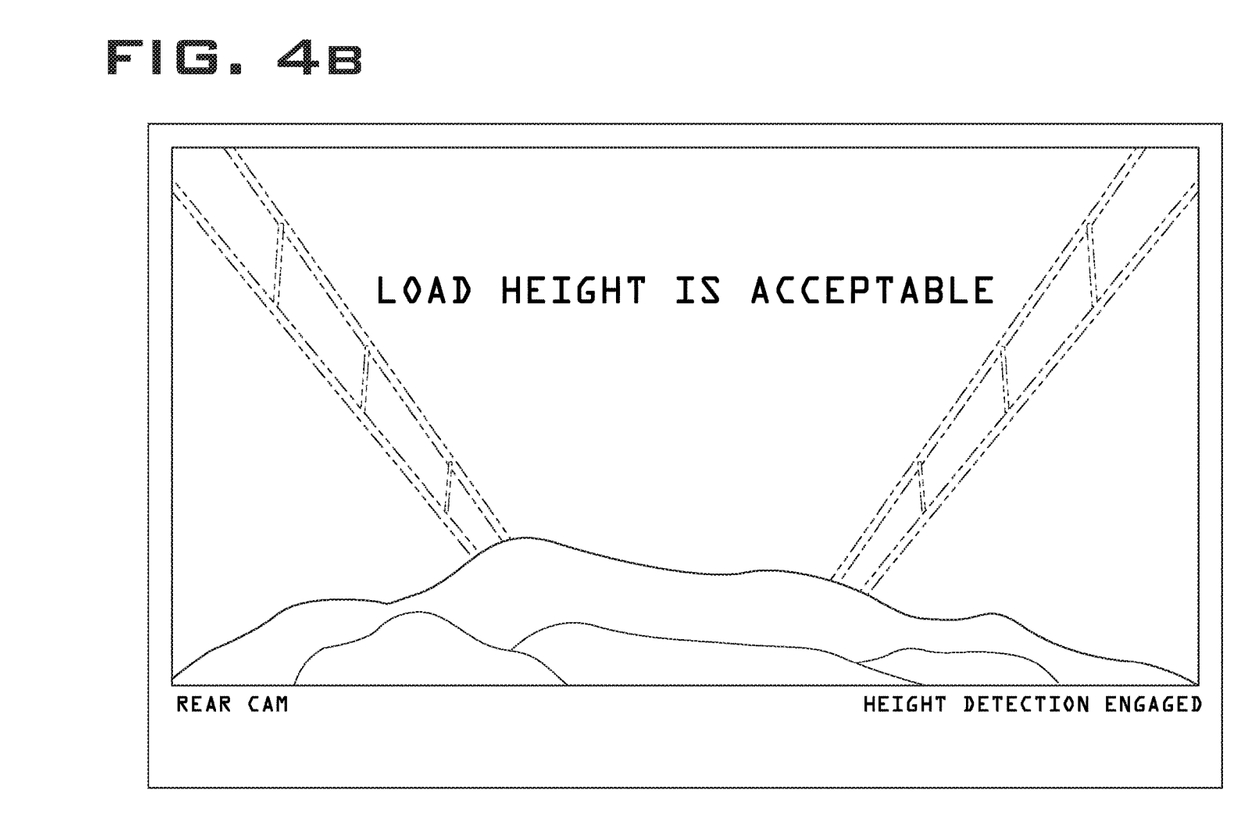
Figure 4C:
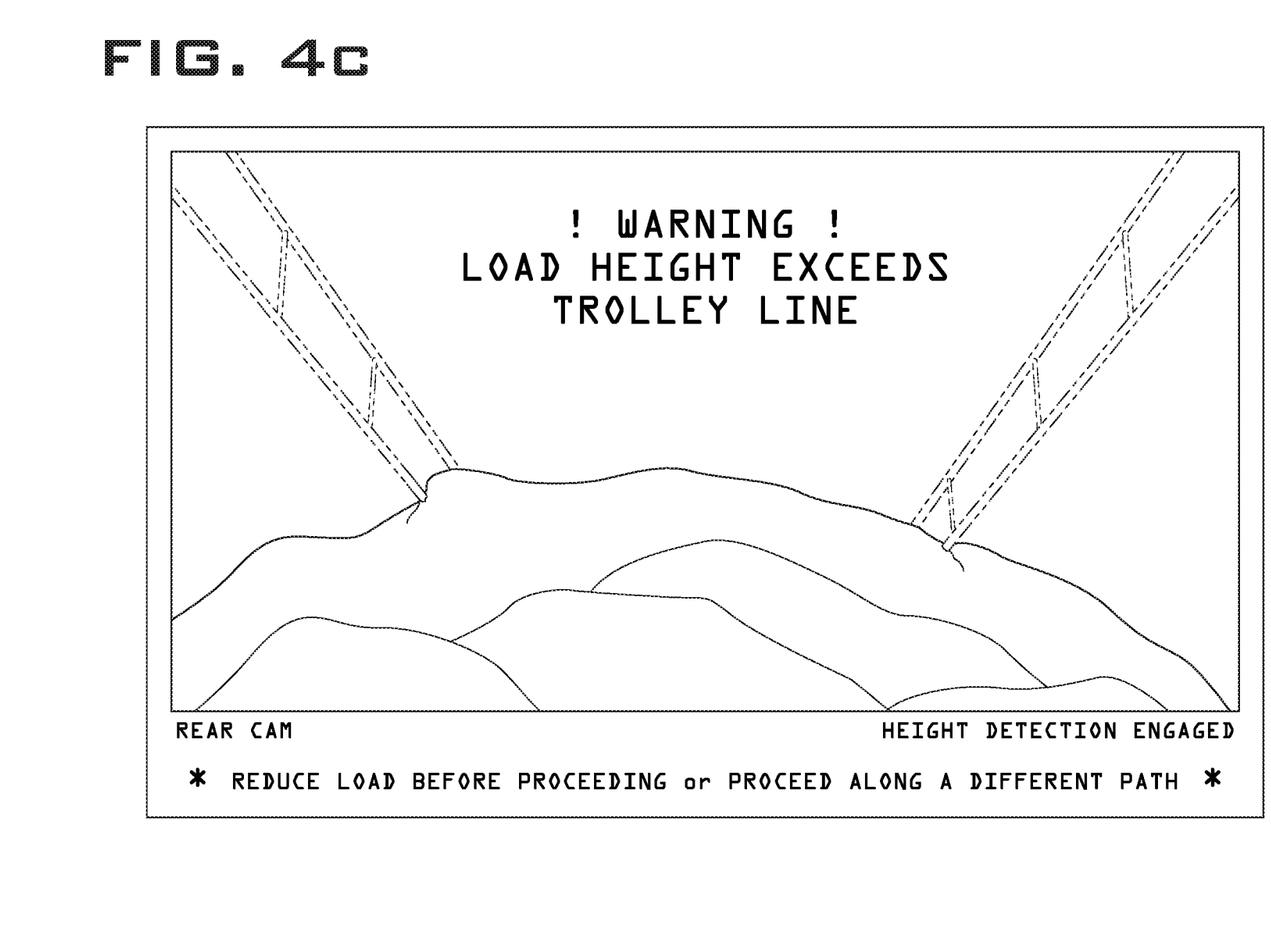

As further shown in FIG. 3, if ECM 220 determines that the height of load 142 exceeds (or is equal to) the height of power lines 182, (block 350—YES), then process 300 may proceed to block 360 and may ECM 220 may provide information indicating that the height of load 142 exceeds the height of power lines 182. For example, ECM 220 may cause display 230 to display, to the operator, high load height information indicating that the height of load 142 exceeds the height of power lines 182 (as illustrated in FIG. 4C). The high load height information may be displayed prior to machine 100 traveling under power line 182. For instance, the high load height information may include textual information indicating that that the height of load 142 exceeds the height of power lines 182. The textual information may include instructions to the operator. For example, the instructions may include an instruction to travel along another path and information identifying the other path, an instruction to decrease a quantity of load 142 so as to reduce the height of load 142, an instruction to decrease a height of the highest portion of load 142, and/or an instruction to discard or dump load 142. Accordingly, the operator may cause machine 100 to travel along the other path, decrease a quantity of load 142 so as reduce the height of load 142, decrease a height of the highest portion of load 142, and/or discard or dump load 142.

In some embodiments, ECM 220 may obtain information identifying a location of machine 100 using the GPS and may identify the other path based on the location. For example, ECM 220 may identify one or more alternative paths within a threshold distance of the location and select the other path from the one or more alternative paths based on one or more criteria (e.g., previously traveled path, closest path, preferred path identified by the preference information, and/or the like). Additionally, or alternatively, ECM 220 may receive the information identifying the other path from a device, such as a user device of another operator, the back office system, and/or the like.

Additionally, or alternatively, the high load height information may include graphical information. For example, ECM 220 may cause phantom lines, of power lines 180, to be displayed by display 230 and cause the phantom lines to be highlighted and/or visual distinguished. For example, the phantom lines may be provided using a particular color (e.g., red), may be flashing, and/or may be provided using any other method to alert the operator that the height of load 142 exceeds the height of power lines 182.

In some embodiments, ECM 220 may modify an operation of machine 100, in addition to or instead of providing information indicating that the height of load 142 exceeds the height of power lines 182. For example, ECM 220 may cause machine 100 to be immobilized. For instance, ECM 220 may cause an engine of machine 100 to shut off and/or may cause rear ground engaging members 160 and/or front ground engaging members 170 to be immobilized. Additionally, or alternatively, ECM 220 may cause machine 100 to slow down or decelerate. For example, ECM 220 may cause the engine to slow down or derate.

As further shown in FIG. 3, if ECM 220 determines that the height of load 142 does not exceed the height of power lines 182, (block 350—NO), then process 300 may proceed to block 370 and ECM 220 may provide information indicating that the height of load 142 does not exceed the height of power lines 182. For example, ECM 220 may cause display 230 to display, to the operator, low load height information indicating that the height of load 142 does not exceed the height of power lines 182 (as illustrated in FIG. 4B), in a manner similar to that described above with respect to block 360. The low load height information may be displayed prior to machine 100 traveling under power line 182.

In some embodiments, the image of load 142 may be an image feed or a video of load 142 and ECM 220 may periodically (based on a time interval and/or movement of machine 100) repeat the process of blocks 340 to 370. For example, ECM 220 may periodically receive and analyze the image feed or the video to determine whether the height of load 142. For instance, based on periodically analyzing the image feed or the video, ECM 220 may identify a change in the height of load 142. The change in the height of load 142 may be caused by movement of load 142 (or a portion of load 142) in light of movement of machine 100 during the time interval. As an example, the change in the height of load 142 may indicate that the height of load 142 no longer exceeds the height of power lines 182 (if ECM 220 previously determined that the height of load 142 exceeded the height of power lines 182). Alternatively, the change in the height of load 142 may indicate that the height of load 142 now exceeds the height of power lines 182 (if ECM 220 previously determined that the height of load 142 did not exceed the height of power lines 182). In some embodiments, information identifying the time interval (period of time) may be submitted using input device 260, a user device, the back office system, and/or the like.

No element, act, or instruction used herein should be construed as critical or essential unless explicitly described as such. While the present disclosure has been referring to power lines (or trolley lines), one skilled in the art would appreciate that the present disclosure similarly applies to a single power line (or trolley line). As used herein, "height" or "distance" may be in a measurement unit to known to one skilled in the art. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

INDUSTRIAL APPLICABILITY

The present disclosure finds utility in various industrial applications, such as in transportation, mining, construction, industrial, earthmoving, agricultural, and forestry machines and equipment. For example, the present disclosure and the provided assistance may be applied to hauling machines, dump trucks, mining vehicles, on-highway vehicles, off-highway vehicles, trains earth-moving vehicles, agricultural equipment, material handling equipment, and/or the like.

More particularly, the present disclosure relates to providing assistance to an operator of a machine, operating in an area with power lines, based on a height of a load placed on the machine. For example, the present disclosure may provide assistance to the operator by providing an indication regarding whether the height of the load exceeds the height of power lines. The height of the load may be determined using an image of the load captured by a camera placed on the machine.

In the event the height of the load exceeds the height of the power lines, the operator may be provided with an indication that the height of the load exceeds the height of the power lines. The indication may instruct the operator to travel along another the path, to reduce a size of the load, to discard the load, and/or the like. Accordingly, damages to the power lines may be prevented, thereby preventing a reduction in productivity at a site in which the machine is operating.

What is claimed is:

1. A method comprising:
 receiving, by an electronic control module of a machine, first information indicating that a load has been placed on the machine,
  the first information being received from a load sensor of the machine;
 receiving, by the electronic control module, second information indicating a movement of the machine towards a path,
  the second information being received from a speed sensor of the machine,
  the path including a power line;
 capturing, by the electronic control module and using a camera associated with the machine, an image of the load based on receiving the first information and receiving the second information;
 determining, by the electronic control module and prior to the machine traveling under the power line, a height of the load based on the image of the load;
 comparing, by the electronic control module and prior to the machine traveling under the power line, the height of the load to a height of the power line; and
 providing, by the electronic control module and for display by a display of the machine, information regarding the height of the load based on the comparing, prior to the machine traveling under the power line.

2. The method of claim 1, where receiving the first information includes:
 receiving information indicating that a weight of the load exceeds a threshold weight, and
 where receiving the second information includes:
 receiving information indicating that a speed of the machine exceeds a threshold speed.

3. The method of claim 1, further comprising:
 determining that the height of the load exceeds the height of the power line based on the comparing,
 where the method further comprise modify an operation of the machine.

4. The method of claim 1, where modifying the operation of the machine includes at least one of
 causing the machine to be immobilized, or
 causing the machine to slow down or decelerate.

5. The method of claim 1, further comprising:
 determining that the height of the load exceeds the height of the power line,
 where providing the information includes:
  providing information indicating that the height of the load exceeds the height of the power line.

6. The method of claim 5, where providing the information indicating that the height of the load exceeds the height of the power line includes:
 identifying another path based on determining that the height of the load exceeds the height of the power line, and
 where the information indicating that the height of the load exceeds the height of the power line includes:
 information identifying the other path, and
 information indicating that the machine is to travel along the other path.

7. The method of claim 5, where providing the information indicating that the height of the load exceeds the height of the power line includes:
 determining that the machine is to discard the load based on determining that the height of the load exceeds the height of the power line, and
 where the information indicating that the height of the load exceeds the height of the power line includes:
 information indicating that the load is to be discard.

8. A system comprising:
 a load sensor configured to detect a load placed on a vehicle that is to travel along a path;
 a camera, associated with the vehicle, configured to capture an image of the load placed on the vehicle; and
 an electronic control module configured to:
  receive, from the load sensor, information indicating that the load has been placed on the vehicle,
  cause the camera to capture the image of the load based on receiving the information indicating that the load has been placed on the vehicle, determine whether the height of the load exceeds a height of a trolley line included in the path, prior to the vehicle traveling under the trolley line; and provide, for display by a display of the vehicle, information indicating whether the height of the load exceeds the height of the trolley line prior to the vehicle traveling under the trolley line.

9. The system of claim 8, where, when determining whether the height of the load exceeds the height of the trolley line, the electronic control module is to:
determine a threshold height above a reference point in the image,
determine a portion of the height of the load above the reference point, and
compare the portion of the height of the load to the threshold height,
where the reference point includes a portion of the machine.

10. The system of claim 9, where, when determining whether the height of the load exceeds the height of the trolley line, the electronic control module is to:
determine that the height of the load exceeds the height of the trolley line when the portion of the height of the load exceeds the threshold height.

11. The system of claim 8, where, when determining whether the height of the load exceeds the height of the trolley line, the electronic control module is to:
determine that the height of the load exceeds the height of the trolley line, and
where, providing the information indicating whether the height of the load exceeds the height of the trolley line, the electronic control module is to:
provide information indicating that that the height of the load exceeds the height of the trolley line.

12. The system of claim 11, where the information indicating that the height of the load exceeds the height of the trolley line includes:
information identifying another path, and
information indicating that the vehicle is to travel along the other path.

13. The system of claim 11, where the information indicating that the height of the load exceeds the height of the trolley line includes:
information indicating the load is to be discarded, or
information indicating that the height of the load is to be reduced.

14. The system of claim 8, where, when determining whether the height of the load exceeds the height of the trolley line, the electronic control module is to:
determine that the height of the load exceeds the height of the trolley line, and
where the electronic control module is to:
cause the vehicle to become immobilized.

15. The system of claim 8, further comprising a speed sensor to:
detect that the vehicle is moving, and
transmit, to the electronic control module, information indicating the vehicle is moving,
where the electronic control module is determine that the vehicle is moving based on the information indicating that the vehicle is moving.

16. The system of claim 15, where, when causing the camera to capture the image of the load, the electronic control module is to:
cause the camera to capture the image of the load further based on the information indicating that the vehicle is moving.

17. A machine comprising:
a load sensor configured to detect a load placed on the machine;
a camera configured to capture an image of the load placed on the vehicle;
a display; and
an electronic control module configured to:
receive, from the load sensor, information indicating that the load has been placed on the vehicle,
cause the camera to capture the image of the load based on receiving the information indicating that the load has been placed on the vehicle,
determine whether the height of the load exceeds a height of a trolley line included in a path along which the machine is to travel prior to the machine traveling under the trolley line; and
cause the display to display information indicating whether the height of the load exceeds the height of the trolley line.

18. The machine of claim 17, where the electronic control module is configured to:
determine that the height of the load exceeds the height of the trolley line, and
cause the machine to be immobilized.

19. The machine of claim 17, where the electronic control module is to determine that the height of the load exceeds the height of the trolley line when the height of the load exceeds a threshold height.

20. The machine of claim 19, where the threshold height is a height above a portion of the machine.

* * * * *